(12) United States Patent
Fossum et al.

(10) Patent No.: US 7,933,163 B2
(45) Date of Patent: Apr. 26, 2011

(54) METHOD AND SYSTEM FOR CONTROLLING THE POSITION OF MARINE SEISMIC STREAMERS

(75) Inventors: Björn A. Fossum, Trondheim (NO); Ola Erik Fjellstad, Trondheim (NO); Arne Rinnan, Malvik (NO)

(73) Assignee: Kongsberg Seatex AS, Trondheim (NO)

( * ) Notice: Subject to any disclaimer, the term of this patent is extended or adjusted under 35 U.S.C. 154(b) by 140 days.

(21) Appl. No.: 11/481,938

(22) Filed: Jul. 7, 2006

(65) Prior Publication Data

US 2008/0008033 A1  Jan. 10, 2008

(51) Int. Cl.
*G01V 1/38* (2006.01)
(52) U.S. Cl. ............................. 367/16; 367/20
(58) Field of Classification Search .............. 367/15–20; 114/245, 253, 242–244
See application file for complete search history.

(56) References Cited

U.S. PATENT DOCUMENTS

| | | | | |
|---|---|---|---|---|
| 3,605,674 A | * | 9/1971 | Weese | 114/245 |
| 3,620,028 A | * | 11/1971 | Wilde | 405/166 |
| 3,774,570 A | * | 11/1973 | Pearson | 114/245 |
| 4,711,194 A | * | 12/1987 | Fowler | 114/245 |
| 5,003,514 A | * | 3/1991 | Cotilla et al. | 367/4 |
| 5,022,013 A | * | 6/1991 | Dalton et al. | 367/4 |
| 5,189,642 A | * | 2/1993 | Donoho et al. | 367/15 |
| 6,011,752 A | * | 1/2000 | Ambs et al. | 367/17 |
| 6,525,992 B1 | * | 2/2003 | Olivier et al. | 367/17 |
| 6,671,223 B2 | * | 12/2003 | Bittleston | 367/19 |
| 7,203,130 B1 | * | 4/2007 | Welker | 367/16 |
| 7,267,070 B2 | * | 9/2007 | Le Page et al. | 114/245 |

FOREIGN PATENT DOCUMENTS

| | | | |
|---|---|---|---|
| WO | WO0020895 | * | 4/2000 |
| WO | WO0175480 | * | 10/2001 |

* cited by examiner

*Primary Examiner* — Mark Hellner
(74) *Attorney, Agent, or Firm* — Dennison, Schultz & MacDonald

(57) ABSTRACT

A method and control device for controlling the position of a marine seismic streamer spread and the ability for controlling individual marine seismic streamers both in shape and position relative to other marine seismic streamers and thereby counter effects from crosscurrent or other dynamic forces in a towed spread behind a seismic survey vessel. The system includes sensor means for determining information to control the streamer and a control device 10, including a housing 11 mechanically and at least partly electrically connected in series between two adjacent sections of the streamer 13, at least three control members 20 projecting from the housing 11, and control means adjusting the respective angular positions of the control members 20 so as to control the lateral and vertical position of the streamer 13. The rotational position of the streamer 13 and control device 10 is measured, and the measured rotational position is used to control the angular position of the control members 20, and thus the lateral and vertical displacement of the streamer 13.

16 Claims, 3 Drawing Sheets

Figure 3

Figure 1A:
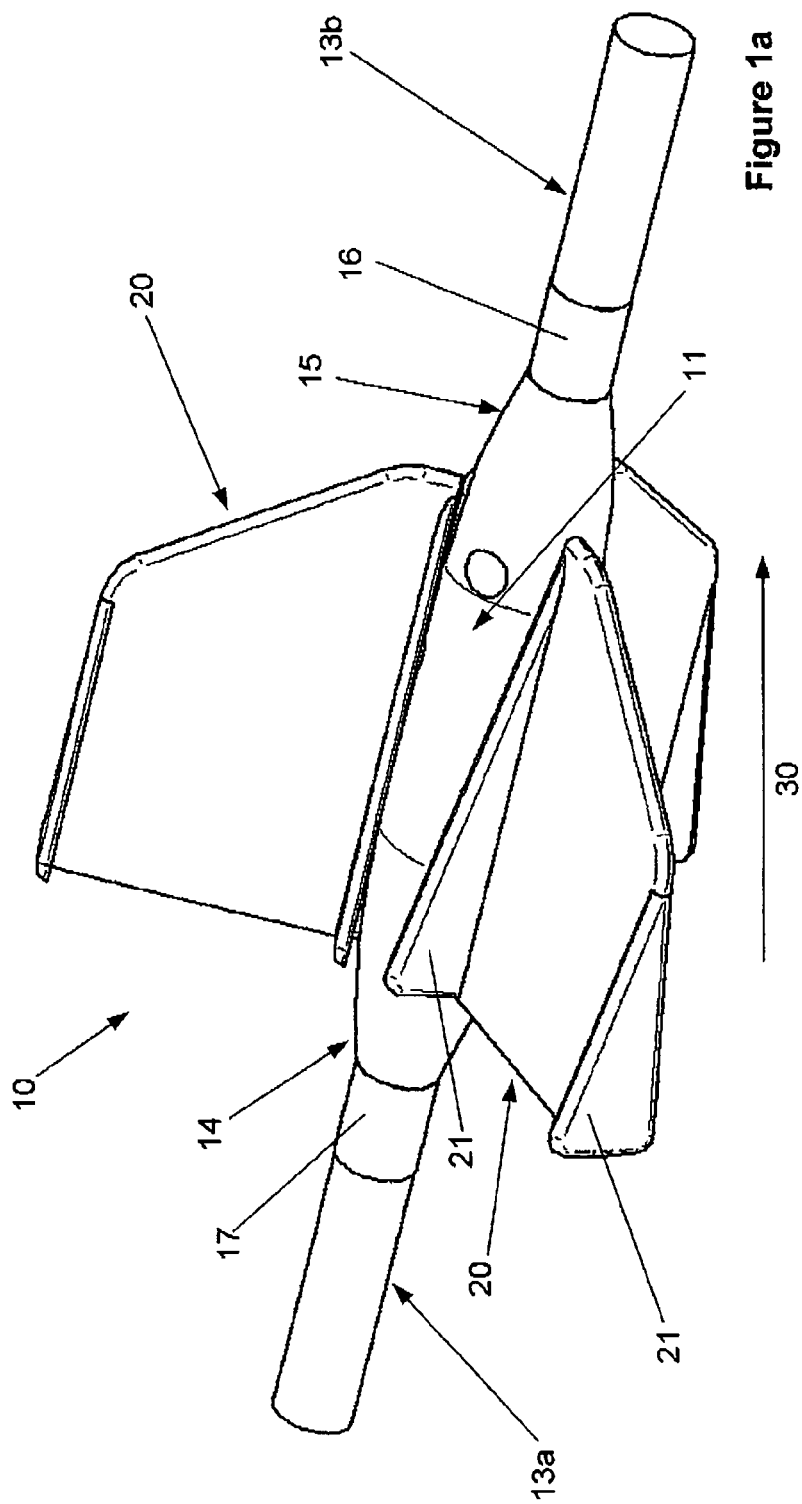

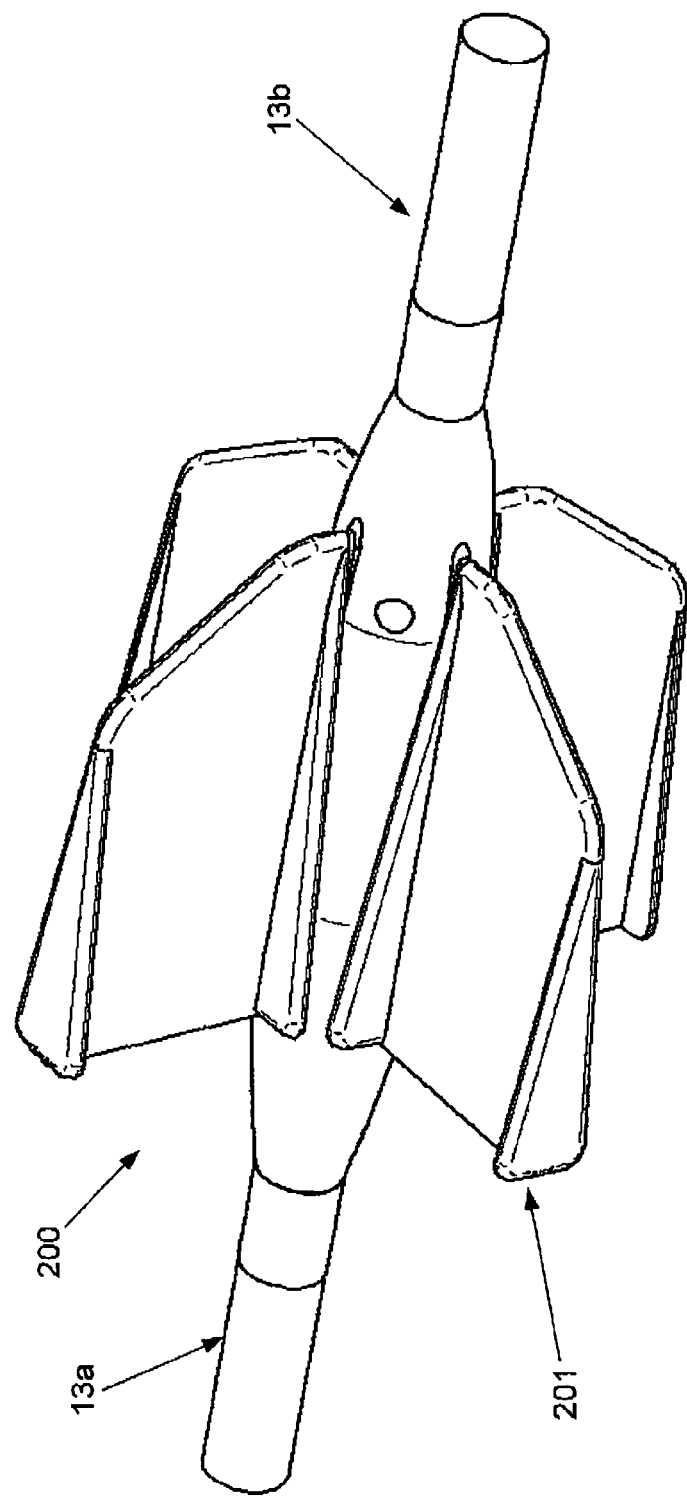
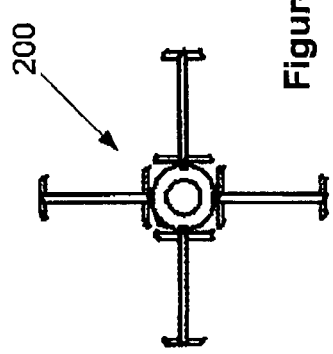

METHOD AND SYSTEM FOR CONTROLLING THE POSITION OF MARINE SEISMIC STREAMERS

The invention relates to a method for controlling marine seismic streamers, as described in the preamble of claim 1. The invention also relates to a system for giving effect to the method, as described in claim 5.

BACKGROUND

A marine seismic streamer is an elongate cable-like structure, (typically up to several thousand meters long), which contains arrays of hydrophones and associated electronic equipment along its length, and which is used in marine seismic surveying. In order to perform a 3D/4D marine seismic survey, a plurality of such streamers are towed behind a seismic survey vessel. Acoustic signals produced by the seismic sources are directed down through the water into the earth beneath, where they are reflected from the various strata. The reflected signals are received by the hydrophones, and then digitized and processed to build up a representation of the earth strata in the area being surveyed.

The streamers are typically towed at a constant depth of about ten meters, in order to facilitate the removal of undesired "ghost" reflections from the surface of the water. To keep the streamers at a constant depth, control devices known as "birds" are attached to each streamer at intervals of 200 to 300 meters.

Low frequency depth variations and lateral motions of towed streamers are inevitable. The main reasons for streamer depth variations are long periodic waves. In general, the worst-case situation is when towing in the same direction as the swell. Streamer lateral motions are mainly due to sea current components perpendicular to the towing direction. In the case of both swell and cross-current influences, the risk of streamer entanglement is therefore increased.

The streamer tension decreases proportional to the distance from the towing point. Therefore, low frequency streamer lateral and vertical motion tends to have larger amplitudes closer to the tail. However, the forces acting perpendicular to the streamer are non-uniformly distributed over the streamer length, and change over time as the towed array moves forward.

During a seismic survey, the streamers are intended to remain straight parallel to each other and equally spaced. However, after deploying the streamers, it is typically necessary for the vessel to cruise in a straight line for at least three streamer lengths before the streamer distribution approximates this ideal arrangement and the survey can begin. This increases the time taken to carry out the survey, and therefore increases the cost of the survey. However, because of sea currents, the streamers frequently fail to accurately follow the path of the seismic survey vessel, sometimes deviating from this path by an angle, known as the feathering angle. This can adversely affect the coverage of the survey, frequently requiring that certain parts of the survey be repeated. In really bad circumstances, the streamers can actually become entangled, especially at the end of the streamers, which can cause great damage and considerable financial loss.

Several patents cover steering devices for seismic streamers.

U.S. Pat. No. 5,443,027 (Norman, L. Owsley et al.) describes a lateral force device for displacing a towed underwater acoustic cable, providing displacement in the horizontal and vertical directions, the device having a spool and a rotationally mounted winged fuselage.

U.S. Pat. No. 6,011,752 (Loran, D. Ambs et al.) describes a seismic streamer position control having a body with a first end and a second end and a bore therethrough from the first end to the second end for receiving a seismic streamer therethrough, at least one control surface, the at least one recess in which is initially disposed the at least one control surface movably connected to the body for movement from and into the at least one recess and for movement, when extended from the body, for attitude adjustment.

U.S. Pat. No. 6,144,342 (Bertheas, Jean et al.) describes a method for controlling the navigation of a towed linear acoustic antenna. Birds equipped with variable-incidence wings are fixed onto the antenna. Through a differential action, the wings allow the birds to be turned about the longitudinal axis of the antenna so that a hydrodynamic force oriented in any given direction about the longitudinal axis of the antenna is obtained. The bird can be detached automatically as the antenna is raised so that the antenna can be wound freely onto a drum. This method also allows full control of the deformation, immersion and heading of the antenna.

WO 03/008906 A2 (Nicholson, James et al.) describes a control device for controlling the position of a marine streamer comprising an annular aerofoil, a mount for mounting the aerofoil onto and around the streamer, and control means for controlling the tilt and/or rotation of the annular aerofoil to thereby adjust the lateral position and/or depth of the streamer.

U.S. Pat. No. 6,671,223 B2 (Bittleston, Simon Hastings) describes a control device or "bird" for controlling the position of a marine seismic streamer, which is provided with an elongate, partly flexible body which is designed to be electrically and mechanical connected in series with a streamer. In a preferred form the bird has two opposed wings which are independently controllable in order to control the streamer's lateral position as well as depth.

U.S. Pat. No. 6,879,542 B2 (Soreau, Didier) describes a bird with a pair of horizontal wings and a pair of vertical wings for lateral and horizontal control respectively. The wing rotation is controlled by pendulum forces on lateral force wing pair.

U.S. Pat. No. 6,459,653 (Kuche, Hans-Walter) describes a collapsible depth controller for mounting in relation to seismic cables or similar devices, comprising two wings, each being rotatably connected to a main body relative to a first axis of rotation perpendicular to the longitudinal direction of the depth controller.

U.S. Pat. No. 5,619,474 (Kuche, Hans-Walter) describes a depth control apparatus for seismic streamers, comprising a central unit adapted for inserted mounting in the streamer substantially in axial alignment with the streamer, a housing which can rotate about the central unit and carries at least one control wing being angularly adjustable about a transverse axis adapted to be substantially horizontal in operative position, and an electric motor for adjusting the angle of the control wing about the transverse axis.

U.S. Pat. No. 6,016,286 (Olivier, Andre W. et al.) describes a depth control device for an underwater cable which includes a rotary actuator having a rotating output shaft connected to a swash plate. Rotation of the swash plate by the actuator causes a rocker arm to pivot about an axis transverse to the axis of the output shaft.

U.S. Pat. No. 6,525,992 (Olivier, Andre W. et al.) describes a device for controlling the position of an underwater cable comprising a body, first and second actuators, and a pair of wings. The body is stationary mountable to the underwater cable and the first and second actuators are disposed in the body. Each wing has an axis of rotation and the wings are coupled to the first and second actuators to control the depth and the horizontal position of the underwater cable in the water.

Birds in accordance with these current designs suffer from a number of disadvantages. Because the birds (in some of the patents mentioned above) hang beneath the streamer, they produce considerable noise as they are towed through the water. This noise interferes with the reflected signals detected by the hydrophones in the streamers. Some of the birds comprise a pair of wings or rudders mounted on a rotatably structure surrounding the seismic steamer in order to generate lift force in a specified direction. This is an expensive and relatively complex electro-mechanical construction that is highly vulnerable in underwater operations. Finally, some of the birds mentioned in the patents above operate with a pair of wings or rudders in a bank-to-turn manoeuvre. This adds complexity to the local control loop, and also slows down the response time of the overall streamer positioning control system.

OBJECT

The main object of the invention is to provide a method and a streamer control device which alleviates at least some of the disadvantages of the current designs. It is an object to facilitate the combination of precise positioning of the streamer spread and the ability to steer individual streamers both in shape and position relative to other streamers and thereby counter effects from crosscurrents or other dynamic forces in a towed spread. An object of the invention is to set up a control force in an arbitrary direction of the bird or streamer, regardless of the rotation angle. Another object is to provide a method and a control device which allows faster course change operations and shorter run-ins after line-turns than current designs.

Finally it is an object to provide a control device that requires small amounts of energy for steering.

THE INVENTION

The method of the invention is described in claim 1 and the control system is described in claim 5. With a streamer control method according to invention, the objects above will be achieved.

Claims 2-4 and 6-15 describe particularly advantageous details of the invention.

According to the present invention, a control device for controlling the position of a marine seismic streamer is provided, the device comprising a housing to be mechanically connected in series between two adjacent sections of the streamer, sensor means in the housing for determining the rotational position of the streamer and housing in a plane perpendicular to the longitudinal axis of the streamer. The device comprises at least three control members projecting outwardly from the housing, each control member being rotatable about an axis which extends transversely of the steamer, and control means responsive to control signals and the sensor means for independently adjusting the respective angular positions of said control members so as to control the lateral and vertical position of the streamer.

In a preferred embodiment of the invention, for use with a multi-section streamer which includes an electric power line, the control means are at least partly electrical and arranged to receive electric power from the electric power line.

When the streamer also includes a control line, the control means are preferably arranged to receive control signals from the control line. To avoid streamer malfunction in the case of mechanical damage of the control device (i.e. leakage), the feed-through of conductors between the streamer sections are separated from the rudder mechanism, controller and sensors.

The control means preferably includes at least two electrical motors, and may also include means for sensing the respective angular positions of the control members, means for sensing the rotational position of the streamer and control device, means for sensing the depth and means for sensing the mutual position between the streamers.

The control strategy is not based on a bank-to-turn manoeuvre. On the contrary, the commanded lift is provided through a suitable combination of the rudders given the actual rotational position of the streamer. Hence, no effort is made for active twisting of the streamer. The streamer with the bird can freely rotate about the longitudinal axis in a natural way and the bird provides lift in an arbitrary chosen direction simultaneously.

Providing a lateral streamer displacement corresponds to the ability to withstand cross-currents that over the full length of the towed array can push the different streamer sections from different angles with variable force. The required lift will depend on cross-current speed and towing speed.

The dominate forces acting on the streamer in the vertical direction are due to wave-induced water movement and changes in the density layers. Depth control might be based on a built in depth sensor, e.g. a pressure sensor.

The control device will operate based on command messages transmitted through the streamers from a dedicated control unit on board.

Advantageously, each control member comprises a rudder having a wing-like shape, with perpendicular wing-like members at the ends to increase the lift effect.

The lift is proportional to the plan form area of the rudder, and changes as a function of the rudder angle of attack, which is controllable through the control means.

Preferably, the control members are detachably connected to the housing and the control devices are preferably equally spaced over the full streamer length. The control members may be detached manually or by remote control in case of malfunction during operation.

The control devices are arranged to control both vertical and lateral motion, preferably simultaneously. The control devices have the flexibility to set up the commanded lift and direction from a free combination of actuators. The control members (rudders) are preferably distributed symmetrically around the streamer longitudinal axis.

Further advantageous features of the invention will appear from the following description.

EXAMPLE

Figure 1B:
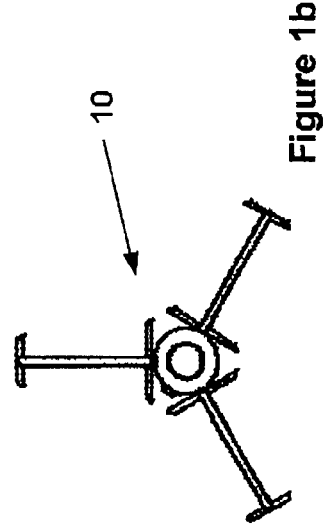
Figure 3:
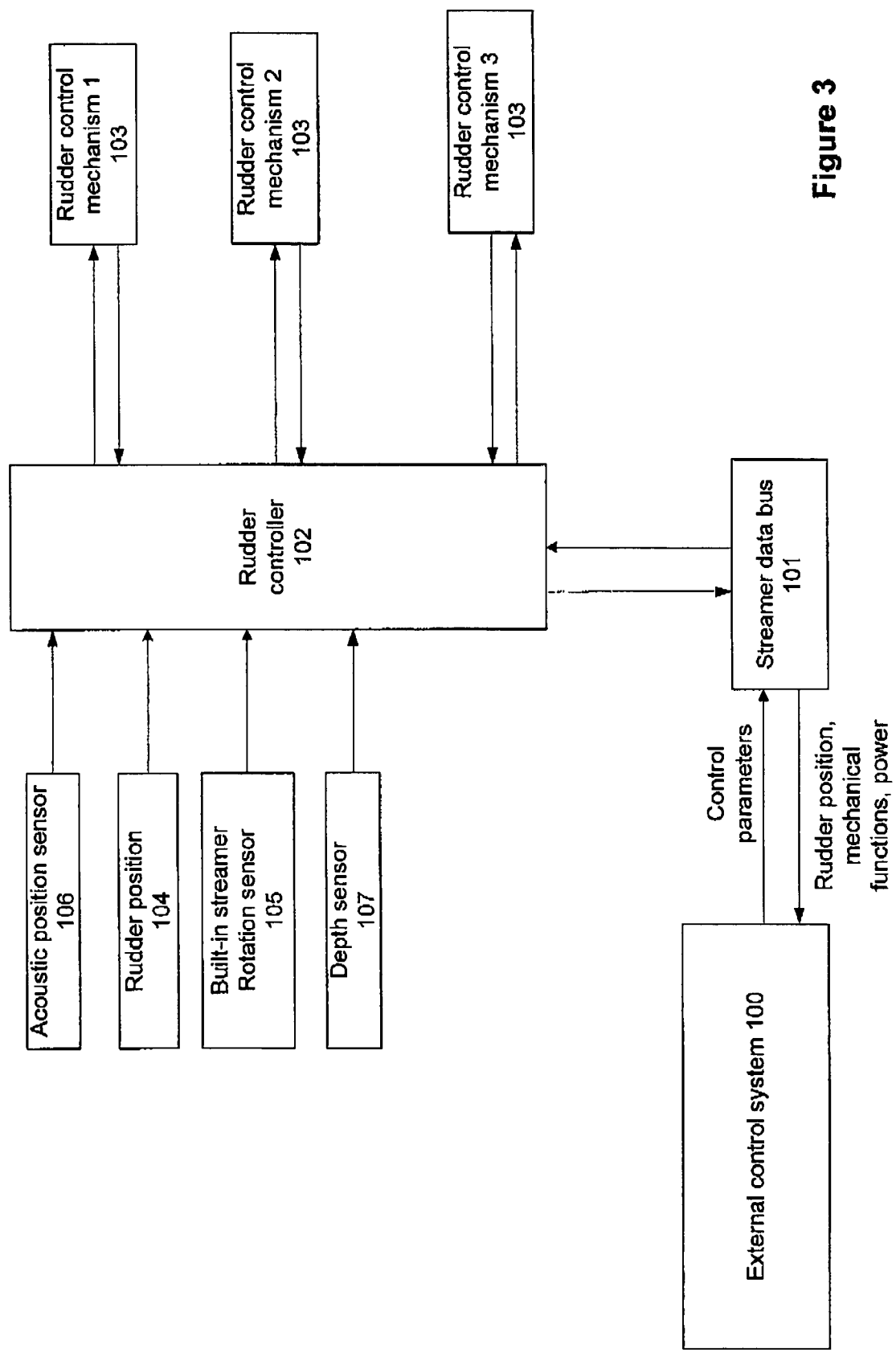

The invention will in the following be described by the way of example with reference to the following Figures, where:

FIG. 1a shows a first embodiment of a control device according to the invention, FIG. 1b shows a cross-section of the control device in FIG. 1a, from behind, FIG. 2a shows a second embodiment of the control device according to the invention, FIG. 2b shows a cross-section of the control device in FIG. 2a, from behind, and FIG. 3 shows a simple schematic of a control system for the streamer of FIG. 1.

FIG. 1 shows a preferred embodiment of the invention. The streamer control device, or "tri-axial bird", is indicated by 10, and comprises an elongated streamlined housing 11, adapted to be mechanically and electrically connected in series in a multi-section marine seismic streamer 13 of the kind which is towed by a seismic survey vessel and which is used, in conjunction with a seismic source also towed by the vessel, to conduct seismic surveys, as briefly described hereinbefore. To permit such connection, each end of the housing 11 is provided with a respective mechanical and electrical connector 14, 15, these connectors being complementary to (or similar to), and designed to interconnect with, streamer end connectors 16, 17, respectively, which are normally used to join together adjacent sections 13a and 13b of the streamer 13. In this way the bird is permanently inserted into the streamer 13, via the existing streamer section connectors, and connects the streamer sections together.

The bird 10 is provided with three control members, or rudders 20 with the shape of a delta wing with shortened ends, positioned evenly around the circumference of the housing 11, with approximately 120° between them, as seen in FIG. 2. The rudders 20 typically projects horizontally outwardly from the housing 11.

The rudders 20 are independently rotatable about their respective rotation axis extending substantially perpendicularly to the longitudinal axis of the housing 11. Rotation of the rudders 20 is effected under the control of a rudder controller 102, sealingly housed within the housing 11. The rudders 20 are provided with delta wings 21 arranged perpendicular to the rudders (20) at the end of the rudder end situated adjacent to the housing 11, and at the end situated away from the housing. The rudders 20 and the wings 21 are arranged with the inclined part facing the movement direction of the tow of the streamer 13 (which direction is indicated by the arrow 30), in order to reduce the possibility of debris becoming hooked on them. To facilitate their rapid removal and reattachment the rudders 20 are connected to the housing 11 by a "quick-snap" device that can be remotely operated (not shown).

Once the rudders 20 have been detached from the housing 11, the streamer 13 can be wound onto and unwound from a large drum used for storing the streamer, with the housing 11 still connected in the streamer.

The bird 10 is connected to an external control system (100), e.g. a "Seismic Towed Array Positioning System" (STAP-system), via a streamer data bus 101. Control parameters are transmitted to the birds 10 to steer the bird 10 in the Y and Z direction. The rudder controller 102 in the bird 10 adjusts the rudders 20 into correct position by controlling rudder control mechanisms 103 connected to each rudder 20. The rudder control mechanism is preferably an electric motor.

The control loop uses feedback from a rudder position sensor 104, feedback from a built-in streamer rotation sensor 105, feedback from an acoustic position sensor 106 and feedback from a depth sensor 107.

The control strategy is as mentioned above not based on a bank-to-turn manner. The commanded lift is provided through a suitable combination of the rudders given the actual rotational position of the streamer 13. No effort is made for active twisting of the streamer, and at the same time the streamer can freely rotate about the longitudinal axis in a natural way.

The bird 10 uses the streamer data bus 101 to relay status from the sensors 104, 105, 106 and 107, mechanical functions and power.

The bird 10 is powered by conductors within the streamer 13 via a rechargeable buffer battery (not shown) in the bird 10 to avoid peak overload of the streamer power system.

To avoid streamer malfunction in the case of mechanical damage of the bird 10 (i.e. leakage), the feed-through of conductors between the streamer sections are separated from the streamer rudder mechanism, controller and sensors.

The control device is arranged to default to neutral (no effect) in case of control failures and/or lack of power.

Maximum force is generated perpendicular to the rudders, minimum forces parallel to the rudders.

FIG. 2a shows a second embodiment of the invention, a four-axial bird 200. The bird 200 includes four rudders 201, similar to the rudders of FIG. 1, where the two opposite rudders 201 work in pairs. The rudders 201 are also arranged evenly around the circumference of the housing 11, and with approximately 90° between them. Each rudder-pair is controllable about its rotation axis and the combination of all four rudders can generate a lift in any direction in the YZ-plane, in the same way as for the three-axial-rudder.

The four-axial bird can be implemented using only two electrical motors, whereas three motors are required in the tri-axial case. Both designs have an orientation that is fixed relative to the streamer. The controlling of the bird 200 is implemented in the same way as for the bird 10.

The invention claimed is:

1. A method for controlling a marine seismic streamer and its spread, with the possibility to control individual marine seismic streamers both in shape and position in relation to other marine seismic streamers and thereby affection from crosscurrent or other dynamic forces on a towed array behind a seismic survey vessel, the method comprising the steps of:

acquiring desired control parameters in Y and Z direction for the marine streamer, in which a control device provided with control members is arranged;

measuring the current dynamic rotation position for the marine streamer with the control device based on:

desired control parameters in only the Y direction by choosing a rotation position reference for the control device so that the rotation stability for the marine streamer with the control device is optimized;

the measured current dynamic rotation position control the angular position of the control members of the control device so that the control device is provided with a rotation position which corresponds to the chosen rotation position reference; and the measured current dynamic rotation position provide a lateral and vertical displacement of the marine streamer according to the desired control parameters in the Y and Z directions, regardless of which rotation position the marine streamer with control device has about its longitudinal axis.

2. A method according to claim 1, wherein the control device is operated either in autonomous or coordinated mode.

3. A method according to claim 1, wherein a control loop provides feedback to an external control system, by means of sensors.

4. A method according to claim 3, wherein the external control system provides control parameters to a control member controller.

5. An apparatus for controlling the position of a marine seismic streamer and its spread with the possibility to control individual marine seismic streamers both in shape and position in relation to other marine seismic streamers and thereby affection from crosscurrent or other dynamic forces on a towed array behind a seismic survey vessel, said apparatus comprising a sensor for determining information to control the streamer, and a control device, wherein the control device comprises:

a housing that is mechanically integrated with and at least partly electrically connected in series between two adjacent sections of the streamer by electrical and mechanical connectors, respectively, at least three control members projecting from the housing, and a control for adjusting the respective angular positions of said control members so as to control the lateral and vertical position of the streamer, wherein the sensor includes rotation sensors integrated in the streamer to measure current dynamic rotational position of the streamer and the housing, and the apparatus is arranged for controlling the angular position of the control members of the control device such that the control device is provided with at rotation position corresponding to the chosen rotation position reference, the apparatus is arranged for, based on the measured current dynamic rotation position, providing lateral and vertical displacement of the marine streamer according to the desired control parameters in Y and Z direction, regardless of which rotation position the marine streamer with the control device have about its longitudinal axis.

6. An apparatus according to claim 5, wherein the control members are rudders having the shape of a wing, positioned evenly around the circumference of the housing.

7. An apparatus according to claim 5, wherein the control members are independently rotatable about their respective rotation axis extending substantially perpendicularly to the longitudinal axis of the housing.

8. An apparatus according to claim 5, wherein the adjustment of the angular positions of the control members is effected by at least one control member control mechanism under the control of a control member controller, sealingly housed within the housing.

9. An apparatus according to claim 5, wherein the sensor also includes a control member position sensor, an acoustic position sensor and a depth sensor.

10. An apparatus according to claim 8, wherein the control member controller includes a control loop having input for feedback from a control member position sensor, feedback from a built-in streamer rotation sensor, feedback from an acoustic position sensor and feedback from a depth sensor.

11. An apparatus according to claim 5, wherein the control device is powered by conductors within the streamer via a rechargeable buffer battery in the control device avoid peak overload of the streamer power system, and the feed-through of the conductors between the streamer sections is separated from the control device to avoid streamer malfunction in case of mechanical failure of the control device.

12. An apparatus according to claim 5, wherein the control device is connected to an external control system, via a streamer data bus.

13. An apparatus according to claim 5, wherein the control device is arranged to default to have no effect on lateral and vertical displacement of the streamer in case of control failures and/or lack of power.

14. An apparatus according to claim 5, wherein the control device is provided with control parameters by an external control system.

15. The method according to claim 1, further comprising remotely controlling a quick-snap device for detachable fastening of the control members.

16. An apparatus according to claim 5, wherein the control members are detachably attached to the housing by a remotely controllable quick-snap device.

* * * * *